(12) United States Patent
Lee

(10) Patent No.: US 12,445,051 B2
(45) Date of Patent: Oct. 14, 2025

(54) VOLTAGE PROVIDING CIRCUIT

(71) Applicant: SK hynix Inc., Gyeonggi-do (KR)

(72) Inventor: Junghan Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 27 days.

(21) Appl. No.: 18/645,373

(22) Filed: Apr. 25, 2024

(65) Prior Publication Data

US 2025/0260315 A1   Aug. 14, 2025

(30) Foreign Application Priority Data

Feb. 14, 2024   (KR) .................. 10-2024-0021117

(51) Int. Cl.
*H02M 3/07* (2006.01)
*H03K 19/0175* (2006.01)
*H03K 19/20* (2006.01)

(52) U.S. Cl.
CPC ............. *H02M 3/07* (2013.01); *H02M 3/072* (2021.05); *H03K 19/017509* (2013.01); *H03K 19/20* (2013.01)

(58) Field of Classification Search
None
See application file for complete search history.

(56) References Cited

U.S. PATENT DOCUMENTS

| | | | |
|---|---|---|---|
| 6,232,830 B1* | 5/2001 | Fournel | H02M 3/073 327/540 |
| 7,081,776 B2* | 7/2006 | Kato | G11C 16/30 327/536 |
| 7,158,412 B2* | 1/2007 | Rodgers, III | G11C 29/021 365/189.11 |
| 7,502,264 B2* | 3/2009 | Rodgers, III | G11C 5/145 365/185.11 |
| 7,538,600 B2* | 5/2009 | Lee | G11C 5/143 327/536 |
| 7,876,079 B2* | 1/2011 | Nirschl | G11C 5/147 323/283 |
| 8,400,212 B1* | 3/2013 | Nguyen | G11C 29/021 327/536 |
| 9,245,596 B1* | 1/2016 | Yang | G11C 16/12 |
| 9,998,000 B2* | 6/2018 | Zhang | H02M 3/07 |

(Continued)

FOREIGN PATENT DOCUMENTS

| | | |
|---|---|---|
| KR | 10-2010-0000140 A | 1/2010 |
| KR | 10-1390393 B1 | 4/2014 |

*Primary Examiner* — Thomas J. Hiltunen
(74) *Attorney, Agent, or Firm* — IP & T GROUP LLP

(57) ABSTRACT

A voltage providing circuit includes a charge pump circuit configured to perform a charge pumping operation in response to a comparison signal, and to output a charge-pumped output voltage to an output node, and a voltage adjusting circuit configured to control a voltage of the output node by generating a drive voltage based on a reference voltage selection signal and a sink enable signal, and outputting the drive voltage to the output node. In a first time section in which the charge pump circuit is deactivated, the voltage adjusting circuit may output the drive voltage to the output node. In a second time section in which the charge pump circuit is activated, the charge pump circuit performs charging and pumping of the drive voltage and outputs the output voltage at a level of a first output voltage lower than a power supply voltage.

20 Claims, 5 Drawing Sheets

(56) References Cited

U.S. PATENT DOCUMENTS

| | | | | |
|---|---|---|---|---|
| 10,340,794 B1* | 7/2019 | Zhang | .................... | H02M 3/158 |
| 10,468,978 B2* | 11/2019 | Zhang | .................... | H02M 3/073 |
| 11,990,829 B2* | 5/2024 | Venturelli | ............... | H02M 3/07 |
| 12,028,078 B2* | 7/2024 | Sinha | ...................... | H02M 3/07 |

* cited by examiner

VOLTAGE PROVIDING CIRCUIT

CROSS-REFERENCE TO RELATED APPLICATION

This patent application claims the priority under 35 U.S.C. § 119 to, and benefits of, Korean patent application No. 10-2024-0021117, filed on Feb. 14, 2024, which is hereby incorporated by reference herein in its entirety.

TECHNICAL FIELD

Embodiments of the present disclosure generally relate to a voltage providing circuit capable of providing various voltages.

BACKGROUND

An electronic device may generate various voltages to operate internal components thereof, and may supply the generated voltages to the internal components. The electronic device may use a charge pump circuit that converts an input voltage into a higher output voltage or converts the input voltage into a lower output voltage to generate various voltages.

The charge pump circuit may be activated or deactivated by an external control signal. The activated charge pump circuit may output a voltage that is higher or lower than an input voltage thereof. The deactivated charge pump circuit may be configured to output a voltage equal to an input voltage thereof. However, due to such characteristics of the charge pump circuit, it may be difficult for the deactivated charge pump circuit to be immediately switched from an output voltage higher or lower than the input voltage to an output voltage equal to the input voltage. Due to occurrence of such delay in voltage transition, a constituent component for receiving the output voltage within the charge pump circuit might not normally operate. In order to address such issues of the charge pump circuit, circuits (e.g., a pull-up circuit and a pull-down circuit) for supporting level shifting (or level switching) of the output voltage may be additionally used.

SUMMARY

Various embodiments of the present disclosure relate to a voltage adjusting circuit capable of generating an output voltage lower than an input voltage in a charge pump circuit designed to convert an input voltage into a higher output voltage, and a voltage providing circuit including the same.

In accordance with an embodiment of the present disclosure, a voltage providing circuit may include a charge pump circuit configured to perform a charge pumping operation in response to a comparison signal, and to output a charge-pumped output voltage to an output node, and a voltage adjusting circuit configured to control a voltage of the output node by generating a drive voltage based on a reference voltage selection signal and a sink enable signal, and outputting the drive voltage to the output node. In a first time section in which the charge pump circuit is deactivated, the voltage adjusting circuit may output the drive voltage to the output node. In a second time section in which the charge pump circuit is activated, the charge pump circuit performs charging and pumping of the drive voltage and controls the output voltage at a level of a first output voltage lower than a power supply voltage.

In accordance with another embodiment of the present disclosure, a voltage providing circuit may include a charge pump circuit configured to perform a charge pumping operation in response to a comparison signal, and to output a charge-pumped output voltage to an output node; and a voltage adjusting circuit configured to control a voltage provided to the output node at a level of a power supply voltage or at a level of a drive voltage based on a reference voltage selection signal and a sink enable signal within a time section in which the charge pump circuit is deactivated, wherein the drive voltage is lower than the power supply voltage and higher than a ground voltage.

It is to be understood that both the foregoing general description and the following detailed description of the present disclosure are illustrative and descriptive and are intended to provide further description of the embodiments of the present disclosure as claimed.

BRIEF DESCRIPTION OF THE DRAWINGS

The above and other features and beneficial aspects of the embodiments of the present disclosure will become readily apparent with reference to the following detailed description when considered in conjunction with the accompanying drawings.

DETAILED DESCRIPTION

Figure 1:
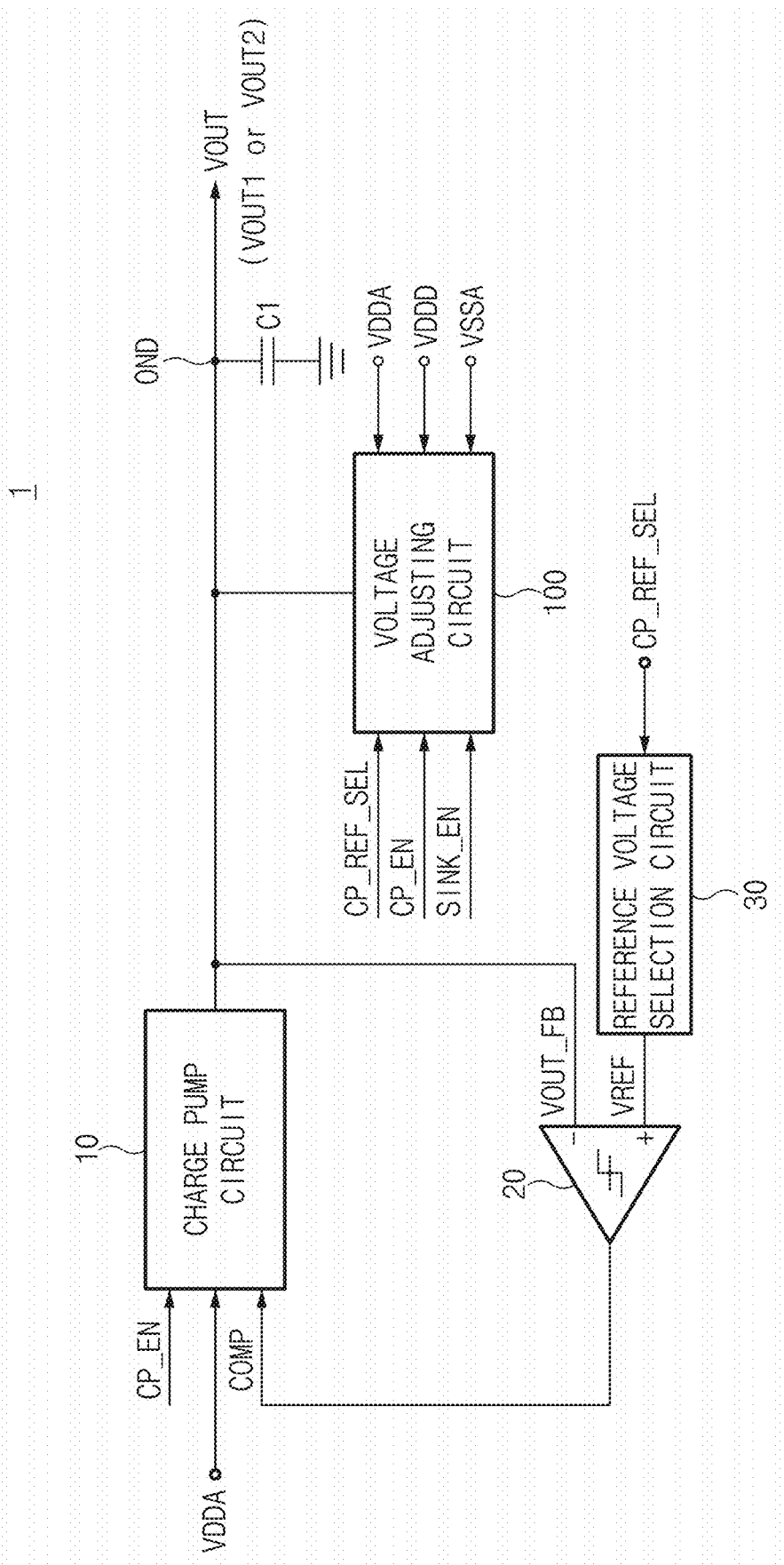
FIG. 1 is a block diagram illustrating a voltage providing circuit based on some embodiments of the present disclosure.

The present disclosure provides embodiments and examples of a voltage providing circuit capable of providing various voltages that may be used in configurations to substantially address one or more technical or engineering issues and to mitigate limitations or disadvantages encountered in some voltage providing circuits in the art. Some embodiments of the present disclosure relate to a voltage adjusting circuit capable of generating an output voltage lower than an input voltage in a charge pump circuit designed to convert an input voltage into a higher output voltage, and a voltage providing circuit including the same. In recognition of the issues above, the voltage providing circuit based on some embodiments of the present disclosure can provide the effect of stably providing the voltage (i.e., an output voltage higher or lower than the input voltage of the charge pump circuit) required for the driving operation of the electronic circuit while reducing chip size and power consumption.

Reference will now be made in detail to some embodiments of the present disclosure, examples of which are illustrated in the accompanying drawings. Wherever possible, the same reference numbers will be used throughout the drawings to refer to the same or like parts. While this disclosure is susceptible to various modifications and alternative forms, specific embodiments thereof are shown by way of example in the drawings. However, the present disclosure should not be construed as being limited to the embodiments set forth herein.

Hereinafter, various embodiments will be described with reference to the accompanying drawings. However, it should be understood that the present disclosure is not limited to specific embodiments, but includes various modifications, equivalents and/or alternatives of the embodiments. The embodiments of the present disclosure may provide a variety of effects capable of being directly or indirectly recognized.

FIG. 1 is a block diagram illustrating a voltage providing circuit 1 based on some embodiments of the present disclosure.

Referring to FIG. 1, the voltage providing circuit 1 may generate power supply voltages having a plurality of different levels and ground voltages having a plurality of different levels. Further, the voltage providing circuit 1 may supply the power supply voltages and the ground voltages to terminals included in an electronic device that requires the corresponding power supply voltage or ground voltage. For example, the electronic device may be implemented as an application processor, a memory device, an image sensing device, or a communication device, but other embodiments are also possible.

For example, when the electronic device is the image sensing device, the voltage providing circuit 1 may supply a voltage to at least one of a boosting circuit, a dual conversion gain (DCG) circuit, and a negative deep trench isolation (NDTI) bias voltage generation circuit. Here, the boosting circuit may perform voltage boosting to a high voltage to increase capacitance of a floating diffusion node that stores or accumulates photocharges generated by sensing light. The DCG circuit may change capacitance of the floating diffusion node to adjust a conversion gain within a pixel, and may thus acquire a high dynamic range (HDR) image. The NDTI bias voltage generation circuit may suppress dark current of a deep trench isolation (DTI) structure configured to optically isolate adjacent pixels from each other.

The voltage providing circuit 1 may include a charge pump circuit 10, a comparator 20, a reference voltage selection circuit 30, and a voltage adjusting circuit 100.

The charge pump circuit 10 may amplify a power supply voltage VDDA in response to a charge pump enable signal CP_EN and a comparison signal COMP, and may generate an output voltage (for example, VOUT2 to be described later) having a higher voltage level than the power supply voltage VDDA. The charge pump circuit 10 may amplify the drive voltage VDDD in response to the charge pump enable signal CP_EN and the comparison signal COMP, and may generate an output voltage (for example, VOUT1 to be described later) having a lower voltage level than the power supply voltage VDDA. Here, the drive voltage VDDD may have a lower level than the power supply voltage VDDA, and may have a higher level than a ground voltage VSSA.

Specifically, the charge pump enable signal CP_EN input to the charge pump circuit 10 may maintain a logic high level as long as the electronic device is turned on. Additionally, the charge pump circuit 10 may perform a charge pumping operation in response to a logic high level of the comparison signal COMP, may generate an output voltage VOUT, and may output the output voltage VOUT to an output node OND. The charge pump circuit 10 may be deactivated in response to a logic low level of the comparison signal COMP.

For example, activation of the charge pump circuit 10 may indicate that the charge pump circuit 10 is electrically connected to the output node OND or the charge pumping operation is performed in response to the comparison signal COMP. On the other hand, deactivation of the charge pump circuit 10 may indicate that the charge pump circuit 10 is electrically separated from the output node OND or stops the charge pumping operation. In the present disclosure, the logic high level may refer to a power supply voltage level, and the logic low level may refer to a ground voltage level.

The comparator 20 may compare a feedback voltage VOUT_FB with a reference voltage VREF, and may provide, to the charge pump circuit 10, a comparison signal COMP corresponding to the comparison result. As an example, the comparator 20 may be implemented as an operational amplifier OP-AMP.

Here, the feedback voltage (VOUT_FB) may represent the output voltage VOUT, and the voltage applied from the charge pump circuit 10 to a first input terminal (i.e., a negative (−) terminal) of the comparator 20 may be referred to as the feedback voltage VOUT_FB. The reference voltage VREF may be applied to a second input terminal (i.e., a positive (+) terminal) of the comparator 20.

In this case, the voltage level of the comparison signal COMP, which is an output signal of the comparator 20, may decrease or increase in response to the feedback voltage VOUT_FB. For example, when the feedback voltage VOUT_FB is lower than the reference voltage VREF, the comparator 20 may output a comparison signal COMP of a logic high level. When the feedback voltage VOUT_FB is higher than the reference voltage VREF, the comparator 20 may output a comparison signal COMP of a logic low level. In some other embodiments, the opposite case to the above-described example may also be possible.

The reference voltage selection circuit 30 may output, to the comparator 20, a reference voltage VREF having a selected voltage level from among different voltage levels in response to a reference voltage selection signal CP_REF_SEL. Here, there may be a plurality of reference voltage selection signals CP_REF_SEL, and the voltage level of the reference voltage VREF may be adjusted according to the one or more reference voltage selection signals CP_REF_SEL.

An embodiment of the present disclosure will disclose an example in which, when the reference voltage selection signal CP_REF_SEL is at a logic low level, the voltage level of the reference voltage VREF is lower than the power supply voltage VDDA and higher than the drive voltage VDDD (e.g., the level of the output voltage VOUT1 to be described later). Another embodiment of the present disclosure will disclose another example in which, when the reference voltage selection signal CP_REF_SEL is at a logic high level, the voltage level of the reference voltage VREF is set to a higher level than the power supply voltage VDDA (e.g., the level of the output voltage VOUT2 to be described later).

The voltage adjusting circuit 100 may adjust the level of the output voltage VOUT in response to the charge pump enable signal CP_EN, the reference voltage selection signal CP_REF_SEL, and the sink enable signal SINK_EN. Specifically, when the voltage adjusting circuit 100 desires to control the output voltage VOUT at a lower level than the power supply voltage VDDA, the voltage adjusting circuit 100 may provide, to the output node OND, a drive voltage VDDD lower than the power supply voltage VDDA in a time section (e.g., a P1 section of FIG. 3 to be described later) in which the charge pump circuit 10 is deactivated.

When the voltage adjusting circuit 100 desires to control the output voltage VOUT at a higher level than the power supply voltage VDDA, the voltage adjusting circuit 100 may provide the power supply voltage VDDA to the output node (OND) during a time section (e.g., a P3 section of FIG. 3 to be described later) in which the charge pump circuit 10 is deactivated.

The capacitor C1 may be connected between the output node OND and the ground terminal. The capacitor C1 may provide a predetermined capacitance so that the voltage of the output node OND can be maintained.

Electronic devices may internally use voltages of various levels. However, since the electronic device does not receive all voltages used internally from the outside, the electronic device may include voltage generators configured to internally generate some voltages. For example, when the electronic device is an image sensing device, the electronic device may include a voltage providing circuit 1 that boosts the power supply voltage VDDA received from the outside and converts the boosted voltage into an output voltage VOUT2 higher than the power supply voltage VDDA. The voltage providing circuit 1 may include a charge pump circuit 10, which is a multi-stage (N-stages) direct current to direct current (DC-DC) voltage conversion circuit having a plurality of pump units.

In general, when an output voltage lower than the power supply voltage is required in the electronic device containing a DC-DC voltage conversion circuit, a desired output voltage may be generated either using a low dropout (LDO) regulator such as a linear power supply or using a buck converter such as a switched mode power supply. In this case, not only the charge pump circuit, but also the LDO regulator or the buck converter and separate elements (e.g., resistor R, inductor L, and capacitor C) required to drive the LDO regulator or the buck converter may be additionally required.

However, the voltage providing circuit 1 based on some embodiments of the present disclosure may pull up the output voltage VOUT to the drive voltage or the power supply voltage VDDA during a time section (e.g., P1 and P3 sections of FIG. 3 to be described later) in which the charge pump circuit 10 is deactivated by the voltage adjusting circuit 100. In addition, the voltage providing circuit 1 may perform charging and pumping of the drive voltage VDD during a time section in which the charge pump circuit 10 is activated (e.g., a P2 section of FIG. 3 to be described later), so that the voltage providing circuit 1 can generate an output voltage VOUT1 lower than the power supply voltage VDDA applied to the charge pump circuit 10. In addition, the voltage providing circuit 1 may perform charging and pumping of the power supply voltage VDDA during a time section in which the charge pump circuit 10 is activated (e.g., a P4 section of FIG. 3 to be described later), so that the voltage providing circuit 1 may generate an output voltage VOUT2 higher than the power supply voltage VDDA applied to the charge pump circuit 10.

That is, the voltage providing circuit 1 based on some embodiments of the present disclosure may generate not only the output voltage VOUT2 higher than the power supply voltage VDDA but also the output voltage VOUT1 lower than the power supply voltage VDDA. Accordingly, the voltage providing circuit 1 based on some embodiments of the present disclosure does not require the above low dropout (LDO) regulator (or buck converter) and separate elements required to drive the LDO regulator (or buck converter), such that the voltage providing circuit 1 can stably provide a voltage (e.g., a voltage higher or lower than the power supply voltage) required to drive the electronic circuit while reducing chip size and power consumption.

Figure 2:
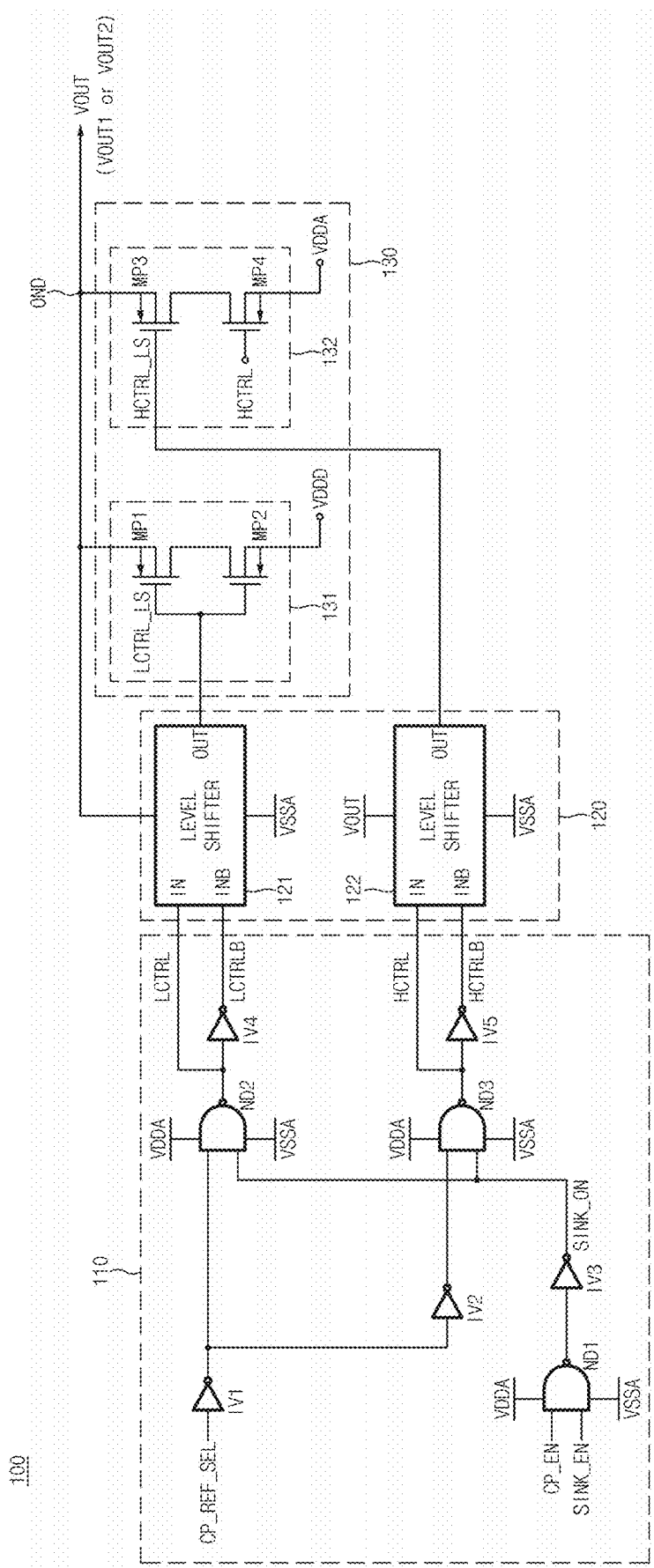
FIG. 2 is a detailed circuit diagram illustrating the voltage adjusting circuit shown in FIG. 1 based on some embodiments of the present disclosure.

FIG. 2 is a detailed circuit diagram illustrating the voltage adjusting circuit 100 shown in FIG. 1 based on some embodiments of the present disclosure.

Referring to FIG. 2, the voltage adjusting circuit 100 may include a control signal generator 110, a voltage level control circuit 120, and a sink circuit 130.

The control signal generator 110 may generate control signals LCTRL, HCTRL, LCTRLB, HCTRLB for controlling the voltage level of the voltage level control circuit 120 in response to the reference voltage selection signal CP_REF_SEL, the charge pump enable signal CP_EN, and the sink enable signal SINK_EN. Here, the control signal LCTRLB may be an inverted signal of the control signal LCTRL, and the control signal HCTRLB may be an inverted signal of the control signal HCTRL.

The control signal generator 110 may generate control signals LCTRL, HCTRL, LCTRLB, HCTRLB by logically combining the reference voltage selection signal CP_REF_SEL, the charge pump enable signal CP_EN, and the sink enable signal SINK_EN. The control signal generator 110 may include a plurality of NAND gates ND1-ND3 and a plurality of inverters IV1-IV5. The power supply voltage VDDA and the ground voltage VSSA may be provided as the driving power of the plurality of NAND gates ND1-ND3.

The NAND gate ND1 may perform a NAND operation between the charge pump enable signal CP_EN and the sink enable signal SINK_EN. The inverter IV3 may generate the sink control signal SINK_ON by inverting the output signal of the NAND gate ND1. Here, the inverting of the signal may refer to converting the power supply voltage VDDA into the ground voltage VSSA or converting the ground voltage VSSA into the power supply voltage VDDA. In some embodiments, the NAND gate ND1 and the inverter IV3 that generate a sink control signal SINK_ON by logically combining the charge pump enable signal CP_EN and the sink enable signal SINK_EN will hereinafter be collectively referred to as "first logic combination circuit".

The NAND gate ND2 may generate a control signal LCTRL by performing a NAND operation between the reference voltage selection signal CP_REF_SEL inverted by the inverter IV1 and the sink control signal SINK_ON. The inverter IV4 may generate the control signal LCTRLB by inverting the control signal LCTRL. In some embodiments, not only the NAND gate ND2 that generates the control signal LCTRL by logically combining an inversion signal of the reference voltage selection signal CP_REF_SEL and the sink control signal SINK_ON, but also the inverters IV1, IV4 will hereinafter be collectively referred to as "second logical combination circuit".

The NAND gate ND3 may generate a control signal HCTRL by performing a NAND operation between the output signal of the inverter IV2 and the sink control signal SINK_ON. The inverters IV1, IV2 may perform non-inverting delay of the reference voltage selection signal CP_REF_SEL. The inverter IV5 may generate the control signal HCTRLB by inverting the control signal HCTRL. In some embodiments, not only the NAND gate ND3 that generates the control signal HCTRL by logically combining the reference voltage selection signal CP_REF_SEL and the sink control signal SINK_ON, but also the inverters IV2, IV5 will hereinafter be collectively referred to as "third logical combination circuit".

The voltage level control circuit 120 may generate voltage level control signals LCTRL_LS, HCTRL_LS for controlling the sink circuit 130 in response to the control signals LCTRL, HCTRL, LCTRLB, HCTRLB.

The voltage level control circuit 120 may include level shifters 121, 122. In this case, the level shifter 121 may generate a voltage level control signal LCTRL_LS in response to the control signals LCTRL, LCTRLB. The level shifter 122 may generate a voltage level control signal HCTRL_LS in response to the control signals HCTRL, HCTRLB.

The sink circuit 130 may output a sink voltage to the output node OND in response to the voltage level control signals LCTRL_LS, HCTRL_LS. Here, the sink voltage may be set to a drive voltage VDDD lower than the power supply voltage VDDA or may be set to the power supply voltage VDDA. In some embodiments, the drive voltage VDDD and the power supply voltage VDDA will hereinafter be collectively defined as "sink voltage". The sink circuit 130 may provide a sink voltage to the output node OND during a deactivation section of the charge pump circuit 10. Accordingly, the voltage providing circuit 10 may perform charging and pumping of the sink voltage during the activation section of the charge pump circuit 10, so that the voltage providing circuit 10 may control the output voltage VOUT at an output voltage VOUT1 level lower than the power supply voltage VDDA or at an output voltage VOUT2 level higher than the power supply voltage VDDA.

The sink circuit 130 may include a plurality of sink controllers 131, 132.

The sink controller 131 may selectively supply the drive voltage VDDD to the output node OND in response to the voltage level control signal (LCTRL_LS). The sink controller 131 may include a plurality of transistors MP1, MP2. The plurality of transistors MP1, MP2 may be PMOS transistors. The transistors MP1, MP2 may be connected in series between the output node OND and the drive voltage VDDD input terminal, so that the transistors MP1, MP2 may receive the voltage level control signal LCTRL_LS through a common gate terminal. For example, the voltage range of the voltage level control signal LCTRL_LS applied to gate terminals of the transistors MP1, MP2 may be located between the ground voltage VSSA level and the output voltage VOUT level.

The sink controller 132 may selectively supply the power supply voltage VDDA to the output node OND in response to the voltage level control signal HCTRL_LS and the control signal HCTRL. The sink controller 132 may include a plurality of transistors MP3, MP4. The plurality of transistors MP3, MP4 may be PMOS transistors. The transistors MP3, MP4 may be connected in series between the output node OND and the power supply voltage VDDA input terminal. The transistor MP3 may receive the voltage level control signal HCTRL_LS through a gate terminal thereof. The transistor MP4 may receive the control signal HCTRL through a gate terminal thereof.

For example, the voltage range of the voltage level control signal HCTRL_LS applied to the gate terminal of the transistor MP3 may be located between the ground voltage VSSA level and the output voltage VOUT level. Additionally, the voltage range of the control signal HCTRL applied to the gate terminal of the transistor MP4 may be located between the ground voltage VSSA level and the power supply voltage VDDA level.

According to an embodiment, the output voltage having a lower level than the power supply voltage VDDA (e.g., 2.8 V) may be referred to as the first output voltage VOUT1 (e.g., 2.4 V), and the output voltage having a higher level than the power supply voltage VDDA may be referred to as the second output voltage VOUT2 (e.g., 3.2 V). In addition, the drive voltage VDDD (e.g., 1.1 V) may have a lower level than the power supply voltage VDDA and may have a higher level than the ground voltage VSSA. The ground voltage VSSA (e.g., 0 V) may be lower than the drive voltage VDDD.

The operation of the voltage adjusting circuit 100 having the above-described configuration will be described in more detail with reference to the timing diagram of FIG. 3 below.

Figure 3:
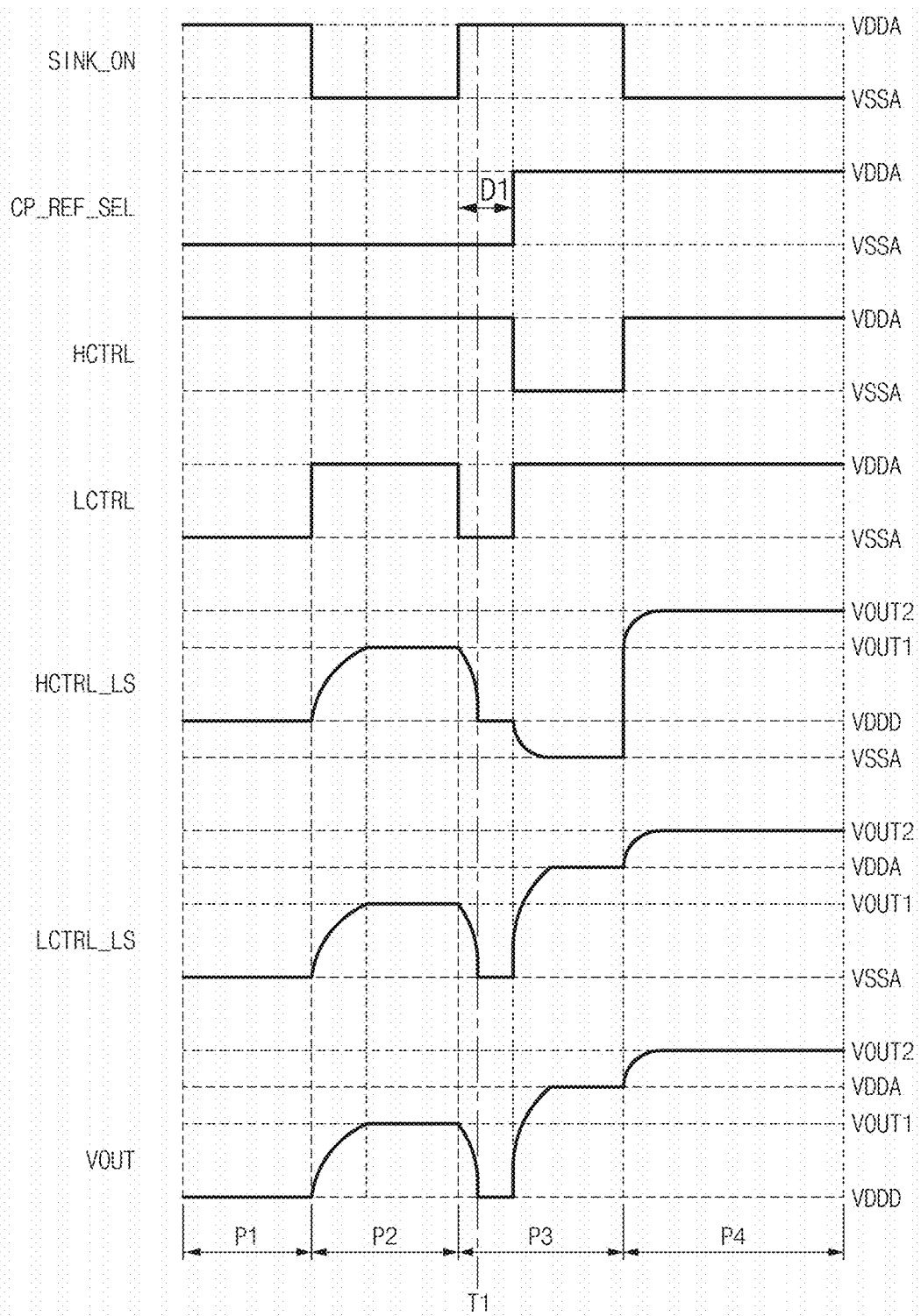
FIG. 3 is a timing diagram illustrating an operation of the voltage providing circuit shown in FIGS. 1 and 2 based on some embodiments of the present disclosure.

FIG. 3 is a timing diagram illustrating an operation of the voltage providing circuit shown in FIGS. 1 and 2 based on some embodiments of the present disclosure.

Referring to FIG. 3, the sink enable signal SINK_EN is maintained at a logic high level during time sections P1, P3 in which the charge pump circuit 10 is deactivated, and the sink enable signal SINK_EN is maintained at a logic high level during time sections (P2, P4) in which the charge pump circuit 10 is activated.

In the time section P1, when the charge pump circuit 10 is deactivated, the sink enable signal SINK_EN may be at a logic high level. Accordingly, the sink control signal SINK_ON may transition to a logic high level by a NAND operation between the NAND gate ND1 and the inverter IV3.

When the charge pump circuit 10 is deactivated, the reference voltage selection signal CP_REF_SEL may be at a logic low level. Accordingly, the NAND gate ND2 may output the control signal LCTRL at a logic low level, and the NAND gate ND3 may output the control signal HCTRL at a logic high level. That is, the control signal generator 110 may logically combine the sink control signal SINK_ON of the logic high level and the reference voltage selection signal CP_REF_SEL of the logic low level, may output the control signals LCTRL, HCTRLB at the logic low level, and may output the control signals LCTRLB, HCTRL at a logic high level.

Afterwards, when the control signal LCTRL of a logic low level is applied to the level shifter 121, the voltage level control signal LCTRL_LS may be output at a logic low level. Then, the transistors MP1, MP2 of the sink controller 131 may be turned on. Accordingly, the drive voltage VDDD may be applied to the output node OND, so that the output voltage VOUT may transition to the drive voltage VDDD level.

When the high-level control signal HCTRL is applied to the level shifter 122, the voltage level control signal HCTRL_LS may be output at the level of the drive voltage VDDD according to the output voltage VOUT. Then, the transistor MP3 of the sink controller 132 may be turned off. In addition, when the control signal HCTRL is at a logic high level, the transistor MP4 is turned off so that the power supply voltage VDDA terminal can be electrically isolated from the output node OND.

In the time section P2, when the charge pump circuit 10 is activated, the sink enable signal SINK_EN may transition to a logic low level. Accordingly, the sink control signal SINK_ON may transition to the logic low level by the combination result of a NAND operation between the NAND gate ND1 and the inverter IV3.

In a situation where the charge pump circuit 10 is activated, the reference voltage selection signal CP_REF_SEL can be maintained at a logic low level. Accordingly, the NAND gate ND2 may output the control signal LCTRL at a logic high level, and the NAND gate ND3 may output the control signal HCTRL at a logic high level. That is, the control signal generator 110 may logically combine the sink control signal SINK_ON of the logic low level and the reference voltage selection signal CP_REF_SEL of the logic low level, and may output the control signals LCTRLB, HCTRLB at the logic low level, so that the control signals LCTRL, HCTRL can be output at a logic high level.

Thereafter, when the control signal LCTRL of the logic high level is applied to the level shifter 121, the voltage level control signal LCTRL_LS may transition to the output voltage VOUT level. Then, the transistors MP1, MP2 may be turned off.

When the control signal HCTRL of the logic high level is applied to the level shifter 122, the voltage level control signal HCTRL_LS may transition to the output voltage VOUT level. Then, the transistor MP3 of the sink controller 132 may be turned off. In addition, when the control signal HCTRL is at a logic high level, the transistor MP4 is turned off so that the power supply voltage VDDA terminal can be electrically isolated from the output node OND.

The comparator 20 may compare the feedback voltage VOUT_FB with the reference voltage VREF, and may provide, to the charge pump circuit 10, a comparison signal COMP corresponding to the comparison result. As described above, when the reference voltage selection signal CP_REF_ SEL is at a logic low level, the reference voltage VREF applied to the comparator 20 may be set to the level of the first output voltage VOUT1. In addition, the drive voltage VDDD may be applied to an input terminal of the feedback voltage VOUT_FB of the comparator 20. Since the drive voltage VDDD is lower than the reference voltage VREF, the comparator 20 may output the comparison signal COMP at a logic high level. Then, the charge pump circuit 10 may perform a charge pumping operation in response to the comparison signal COMP.

When the output voltage VOUT reaches a target voltage value (i.e., a first output voltage VOUT1 level) by the charge pumping operation of the charge pump circuit 10, the comparison signal COMP of the comparator 20 may transition to the logic low level. Accordingly, the output voltage VOUT may be output at the first output voltage VOUT1 level that is higher than the drive voltage VDDD and lower than the power supply voltage VDDA.

In the time section P3, when the charge pump circuit 10 is deactivated, the sink enable signal SINK_EN may transition back to the logic high level. Accordingly, the sink control signal SINK_ON may transition back to the logic high level due to the NAND operation between the NAND gate ND1 and the inverter IV3.

When the charge pump circuit 10 is deactivated, the reference voltage selection signal CP_REF_SEL may be maintained at a logic low level during a time section D1. Accordingly, during the time section D1, the transistors MP1, MP2 of the sink controller 131 may be turned on as in the time section P1 described above. Thus, the drive voltage VDDD is transferred to the output node OND, so that the output voltage VOUT may become the drive voltage VDDD level. The transistor MP3 of the sink controller 132 may be turned off. Additionally, when the control signal HCTRL is at a logic high level, the transistor MP4 is turned off so that the power supply voltage VDDA terminal can be electrically isolated from the output node OND.

Afterwards, after lapse of the time section D1, the reference voltage selection signal CP_REF_SEL and the control signal LCTRL may transition again to the logic high level. Accordingly, the NAND gate ND2 may output the control signal LCTRL at a logic high level, and the NAND gate ND3 may output the control signal HCTRL at a logic low level. That is, the control signal generator 110 may logically combine the sink control signal SINK_ON of the logic high level and the reference voltage selection signal CP_REF_SEL of the logic high level, and may output the control signals LCTRLB, HCTRL at the logic low level, so that the control signals LCTRL, HCTRLB at a logic high level.

Afterwards, when the control signal LCTRL of the logic high level is applied to the level shifter 121, the voltage level control signal LCTRL_LS may be output at the power supply voltage VDDA level according to the output voltage VOUT. Then, the transistors MP1, MP2 of the sink controller 131 may be turned off, such that the drive voltage VDDD terminal can be electrically isolated from the output node OND.

When the control signal HCTRL of a logic low level is applied to the level shifter 122, the voltage level control signal HCTRL_LS may be output at a logic low level. Then, the transistor MP3 of the sink controller 132 may be turned on. When the control signal HCTRL is at a logic low level, the transistor MP4 may be turned on. Accordingly, the power supply voltage VDDA is transmitted to the output node OND, so that the output voltage VOUT may become the power supply voltage VDDA level.

In the time section P4, when the charge pump circuit 10 is activated, the sink enable signal SINK_EN may transition back to the logic low level. Accordingly, the sink control signal SINK_ON may transition to the logic low level due to the NAND operation between the NAND gate ND1 and the inverter IV3.

When the charge pump circuit 10 is activated, the reference voltage selection signal CP_REF_SEL may be maintained at a logic high level. Accordingly, the NAND gate ND2 may output the control signal LCTRL at a logic high level, and the NAND gate ND3 may output the control signal HCTRL at a logic high level. That is, the control signal generator 110 may logically combine the sink control signal SINK_ON of the logic low level and the reference voltage selection signal CP_REF_SEL of the logic high level, and may output the control signals LCTRLB, HCTRLB at the logic low level, so that the control signals LCTRL, HCTRL can be output at a logic high level.

Thereafter, when the control signal LCTRL of the logic high level is applied to the level shifter 121, the voltage level control signal LCTRL_LS may become the output voltage VOUT level. Then, the transistors MP1, MP2 may be turned off.

When the control signal HCTRL of the logic high level is applied to the level shifter 122, the voltage level control signal HCTRL_LS may become the output voltage VOUT level. Then, the transistor MP3 of the sink controller 132 may be turned off. Additionally, when the control signal HCTRL is at a logic high level, the transistor MP4 is turned off, such that the power supply voltage VDDA terminal can be electrically isolated from the output node OND.

The comparator 20 may compare the feedback voltage VOUT_FB with the reference voltage VREF, and may provide a comparison signal COMP corresponding to the comparison result to the charge pump circuit 10. As described above, when the reference voltage selection signal CP_REF_SEL is at a logic high level, the reference voltage VREF applied to the comparator 20 may be set to the level of the second output voltage VOUT2. Additionally, the power supply voltage VDDA may be used as the feedback voltage VOUT_FB of the comparator 20. Since the power supply voltage VDDA is at a lower level than the reference voltage VREF, the comparator 20 may output the comparison signal COMP at a logic high level. Then, the charge pump circuit 10 may perform a charge pumping operation in response to the comparison signal COMP.

When the output voltage VOUT reaches a target voltage value (i.e., the second output voltage VOUT2 level) due to the charge pumping operation of the charge pump circuit 10, the comparison signal COMP of the comparator 20 may transition to the logic low level. Accordingly, the output voltage VOUT may be output at a second output voltage VOUT2 level higher than the power supply voltage VDDA.

As described above, according to the embodiment of the present disclosure, after the level of the output voltage VOUT is previously level-shifted to the sink voltage value in the time sections P1, P3 in which the charge pump circuit 10 is deactivated, the voltage providing circuit may perform charging and pumping of the sink voltage in the time sections P2, P4 in which the charge pump circuit 10 is activated, so that the voltage providing circuit may control the output voltage VOUT level with a voltage level that is lower or higher than the power supply voltage VDDA. Accordingly, the voltage adjusting circuit 100 based on some embodiments of the present disclosure may reduce a settling time during which the output voltage VOUT is stabilized.

Specifically, in time sections P1, P3 in which the charge pump circuit 10 is deactivated, the sink control signal SINK_ON is at a logic high level. Depending on whether the reference voltage selection signal CP_REF_SEL is a logic low level or a logic high level, the voltage providing circuit may output a sink voltage having either a drive voltage VDDD level or a power supply voltage VDDA level to the output node OND.

That is, when the reference voltage selection signal CP_REF_SEL is at a logic low level, the voltage providing circuit may control the output voltage VOUT with a first output voltage VOUT1 level that is lower than the power supply voltage VDDA.

After the output voltage VOUT is used as the drive voltage VDDD lower than the power supply voltage VDDA in the time section P1, when the charge pump circuit 10 operates in the time section P2, the voltage providing circuit may output the first output voltage VOUT1 corresponding to a target voltage by performing charging-pumping of the drive voltage VDDD.

When the reference voltage selection signal CP_REF_SEL is at a logic high level, the voltage providing circuit may control the output voltage VOUT at a second output voltage VOUT2 level higher than the power supply voltage VDDA. After the output voltage VOUT is used as the power supply voltage VDDA in the time section P3, when the charge pump circuit 10 operates in the time section P4, the voltage providing circuit may perform charging and pumping of the power supply voltage VDDA to output the second output voltage VOUT2 corresponding to a target.

Figure 4:
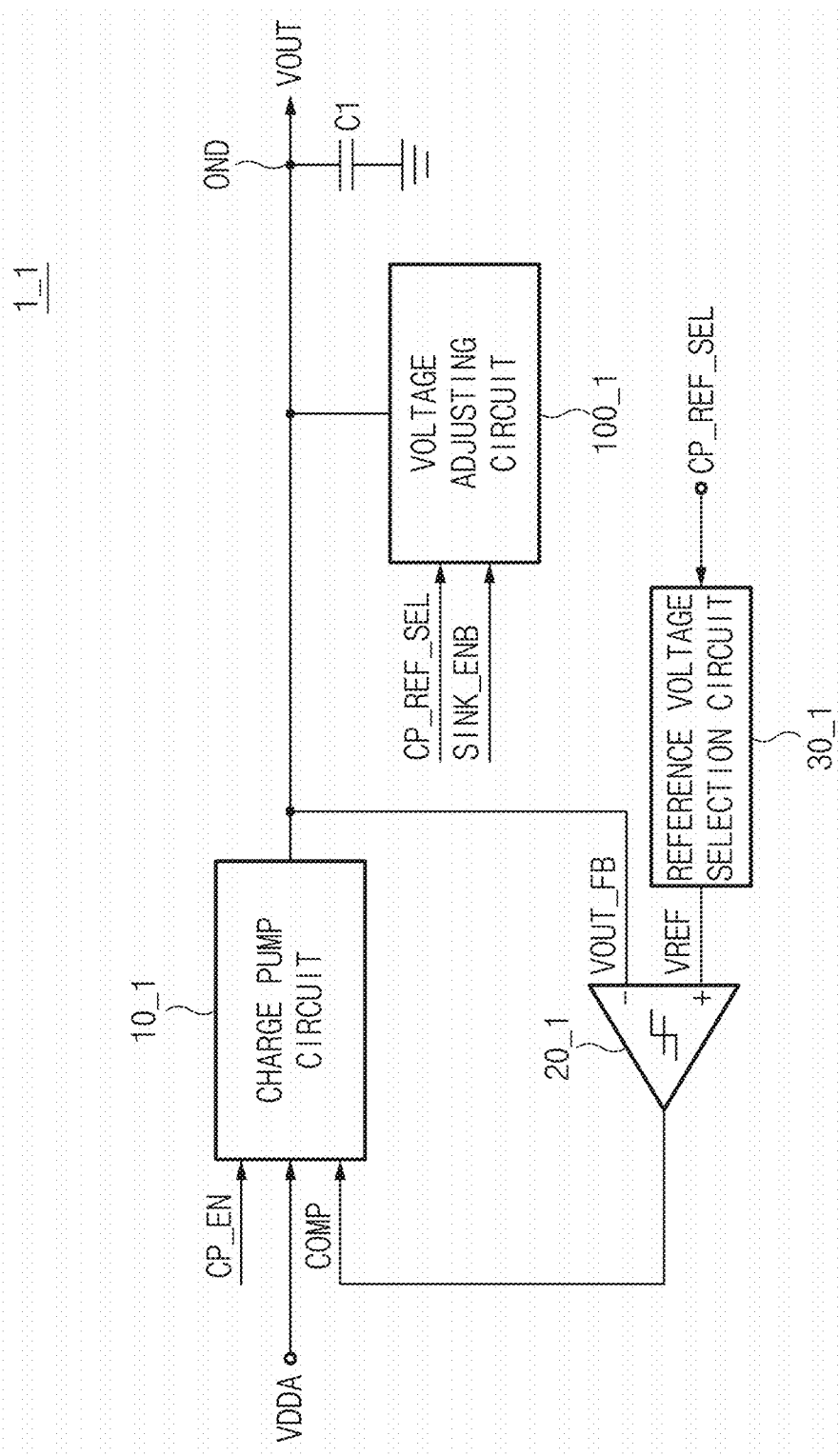
FIG. 4 is a block diagram illustrating a voltage providing circuit based on some other embodiments of the present disclosure.

FIG. 4 is a block diagram illustrating a voltage providing circuit 1_1 based on some other embodiments of the present disclosure.

Referring to FIG. 4, the voltage providing circuit 1_1 may include a charge pump circuit 10_1, a comparator 20_1, a reference voltage selection circuit 30_1, and a voltage adjusting circuit 100_1. The charge pump circuit 10_1, the comparator 20_1, and the reference voltage selection circuit 30_1 for use in the voltage providing circuit 1_1 shown in FIG. 4 are identical in structure to those of FIG. 1, and as such redundant description thereof will herein be omitted for brevity.

The voltage adjusting circuit 100_1 may adjust the level of the output voltage VOUT in response to the reference voltage selection signal CP_REF_SEL and the sink enable bar signal SINK_ENB. Here, the sink enable bar signal SINK_ENB may be an inverted signal of the sink enable signal SINK_EN.

Specifically, when the reference voltage selection signal CP_REF_SEL is at a logic low level, the voltage adjusting circuit 100_1 may provide, to the output node OND, a drive voltage VDDD lower than the power supply voltage VDDA during a time section (e.g., a P1 section of FIG. 3) in which the charge pump circuit 10_1 is deactivated. When the reference voltage selection signal CP_REF_SEL is at a logic high level, the voltage adjusting circuit 100_1 may provide the power supply voltage VDDA to the output node OND in a time section (e.g., P3 section of FIG. 3) in which the charge pump circuit 10_1 is deactivated.

Figure 5:
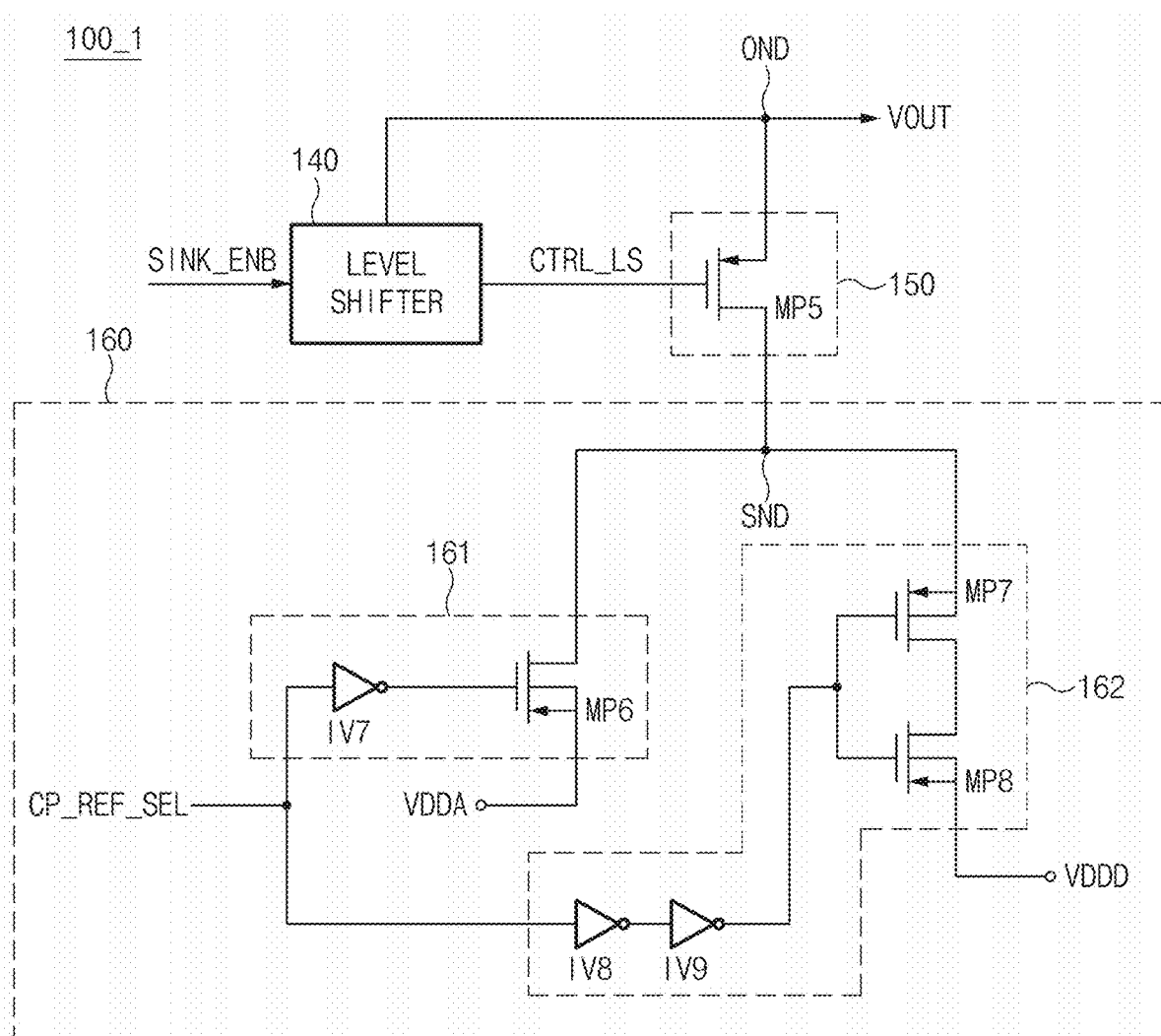
FIG. 5 is a detailed circuit diagram illustrating a voltage adjusting circuit shown in FIG. 4 based on some other embodiments of the present disclosure.

FIG. 5 is a detailed circuit diagram illustrating the voltage adjusting circuit 100_1 shown in FIG. 4 based on some other embodiments of the present disclosure.

Referring to FIG. 5, the voltage adjusting circuit 100_1 may include a level shifter 140, a sink circuit 150, and a voltage level control circuit 160.

The level shifter 140 may generate a voltage level control signal CTRL_LS for controlling the sink circuit 150 in response to the sink enable bar signal SINK_ENB. For example, when the charge pump circuit 10_1 is deactivated, the sink enable bar signal SINK_ENB becomes a logic low level and the voltage level control signal CTRL_LS can be output at a logic low level. When the charge pump circuit 10_1 is activated, the sink enable bar signal SINK_ENB becomes a logic high level and the voltage level control signal CTRL_LS can be output at a logic high level.

The sink circuit 150 may selectively provide, to the output node OND, the output signal of the voltage level control circuit 160 in response to the voltage level control signal CTRL_LS. As an example, when the voltage level control signal CTRL_LS is applied at a logic low level, the sink circuit 150 may transmit, to the output node OND, the power supply voltage VDDA or the drive voltage VDDD received from the sink node SND. In addition, upon receiving the voltage level control signal CTRL_LS of a logic high level, the sink circuit 150 may block electrical connection between the output node OND and the sink node SND.

The sink circuit 150 may include a transistor MP5. The transistor MP5 may be a PMOS transistor. The transistor MP5 may be connected between the output node OND and the sink node SND so that the transistor MP5 may receive the voltage level control signal CTRL_LS through a gate terminal thereof.

The voltage level control circuit 160 may control the level of the sink voltage provided to the sink circuit 150 in response to the reference voltage selection signal CP_REF_SEL. For example, the voltage level control circuit 160 may control the sink node SND at the power supply voltage VDDA level when the reference voltage selection signal CP_REF_SEL is at a logic high level. The voltage level control circuit 160 may control the sink node SND at the drive voltage VDDD level lower than the power supply voltage VDDA when the reference voltage selection signal CP_REF_SEL is at a logic low level.

The voltage level control circuit 160 may include a first level controller 161 and a second level controller 162.

Here, the first level controller 161 may selectively supply the power supply voltage VDDA to the sink node SND in response to the reference voltage selection signal CP_REF_SEL. The first level controller 161 may include an inverter IV7 and a transistor MP6. The transistor MP6 may be a PMOS transistor.

The transistor MP6 may be connected between the sink node SND and the power supply voltage VDDA input terminal, so that the transistor MP6 may receive the reference voltage selection signal CP_REF_SEL inverted by the inverter IV7 through a gate terminal thereof.

The transistor MP6 may be turned on when the reference voltage selection signal CP_REF_SEL is activated to a logic high level, so that the transistor MP6 may output the power supply voltage VDDA to the sink node SND. The transistor MP6 may be turned off when the reference voltage selection signal CP_REF_SEL is deactivated at a logic low level. Accordingly, when the transistor MP6 is turned off, the power supply voltage VDDA can be electrically isolated from the sink node SND.

The second level controller 162 may selectively supply the drive voltage VDDD to the sink node SND in response to the reference voltage selection signal CP_REF_SEL. The second level controller 162 may include a plurality of inverters IV8, IV9 and a plurality of transistors MP7, MP8. The plurality of transistors MP7, MP8 may be PMOS transistors.

The inverters IV8, IV9 may perform non-inverting delay of the reference voltage selection signal CP_REF_SEL, and may output the resultant signal. The transistors MP7, MP8 are connected in series between the sink node SND and the drive voltage VDDD input terminal, such that the transistors MP7, MP8 may receive the output signal of the inverter IV9 through a common gate terminal thereof. When the reference voltage selection signal CP_REF_SEL is deactivated to a logic low level, the transistors MP7, MP8 may be turned on and may output the drive voltage VDDD to the sink node SND. The transistors MP7, MP8 may be turned off when the reference voltage selection signal CP_REF_SEL is activated to a logic high level. Accordingly, when the transistors MP7, MP8 are turned off, the drive voltage VDDD can be electrically isolated from the sink node SND.

As described above, the voltage adjusting circuit 100_1 according to the embodiments of the present disclosure may control the voltage level provided to a drain terminal (i.e., sink node SDN) of the sink circuit 150 at either the power supply voltage VDDA or the drive voltage VDDD level lower than the power supply voltage VDDA. That is, when the reference voltage selection signal CP_REF_SEL is at a logic low level, the first level controller 161 is deactivated and the second level controller 162 is activated, so that the output voltage VOUT can be controlled at the drive voltage VDDD level lower than the power supply voltage VDDA.

As is apparent from the above description, the voltage providing circuit based on some embodiments of the present disclosure can provide the effect of stably providing the voltage (i.e., an output voltage higher or lower than the input voltage of the charge pump circuit) required for the driving operation of the electronic circuit while reducing chip size and power consumption.

The embodiments of the present disclosure may provide a variety of effects capable of being directly or indirectly recognized.

Although a number of illustrative embodiments have been described, it should be understood that modifications and enhancements to the disclosed embodiments and other embodiments can be devised based on what is described and/or illustrated in the present disclosure. Furthermore, the embodiments may be combined to form additional embodiments.

What is claimed is:

1. A voltage providing circuit comprising:
   a charge pump circuit configured to perform a charge pumping operation in response to a comparison signal, and to output a charge-pumped output voltage to an output node; and
   a voltage adjusting circuit configured to control a voltage of the output node by generating a drive voltage based on a reference voltage selection signal and a sink enable signal and outputting the drive voltage to the output node,
   wherein
   in a first time section in which the charge pump circuit is deactivated, the voltage adjusting circuit outputs the drive voltage to the output node; and
   in a second time section in which the charge pump circuit is activated, the charge pump circuit performs charging and pumping of the drive voltage and controls the output voltage at a level of a first output voltage lower than a power supply voltage.

2. The voltage providing circuit according to claim 1, wherein:
   in a third time section in which the charge pump circuit is deactivated after lapse of the second time section, the voltage adjusting circuit outputs the power supply voltage to the output node; and
   in a fourth time section in which the charge pump circuit is activated after lapse of the third time section, the charge pump circuit performs charging and pumping of the power supply voltage and outputs the output voltage at a level of a second output voltage higher than the power supply voltage.

3. The voltage providing circuit according to claim 2, wherein the voltage adjusting circuit includes:
   a control signal generator configured to generate control signals by combining the reference voltage selection signal, a charge pump enable signal, and a sink enable signal;
   a voltage level control circuit configured to generate voltage level control signals in response to the control signals; and
   a sink circuit configured to provide the drive voltage or the power supply voltage to the output node in response to the voltage level control signals.

4. The voltage providing circuit according to claim 3, wherein the control signal generator includes:
   a first logic combination circuit configured to generate a sink control signal by combining the charge pump enable signal and the sink enable signal;
   a second logic combination circuit configured to generate a first control signal among the control signals by combining an inversion signal of the reference voltage selection signal and the sink control signal; and
   a third logic combination circuit configured to generate a second control signal among the control signals by combining the reference voltage selection signal and the sink control signal.

5. The voltage providing circuit according to claim 4, wherein the first logic combination circuit is configured to:
   output the sink control signal at a logic high level when the sink enable signal is activated in each of the first time section and the third time section; and
   output the sink control signal at a logic low level when the sink enable signal is deactivated in each of the second time section and the fourth time section.

6. The voltage providing circuit according to claim 4, wherein the second logic combination circuit includes:
   a first NAND gate configured to generate the first control signal by performing a NAND operation between the inversion signal of the reference voltage selection signal and the sink control signal; and a first inverter configured to generate a third control signal by inverting the first control signal.

7. The voltage providing circuit according to claim 4, wherein the third logic combination circuit includes:

a second NAND gate configured to generate the second control signal by performing a NAND operation between a delay signal of the reference voltage selection signal and the sink control signal; and a second inverter configured to generate a fourth control signal by inverting the second control signal.

8. The voltage providing circuit according to claim 3, wherein the voltage level control circuit includes:

a first level shifter configured to generate a first voltage level control signal in response to a first control signal among the control signals; and a second level shifter configured to generate a second voltage level control signal in response to a second control signal among the control signals.

9. The voltage providing circuit according to claim 8, wherein the first level shifter is configured to:

output the first voltage level control signal at a level of a ground voltage or at a level of the power supply voltage when the first voltage level control signal is at a first logic level; and output the first voltage level control signal at a level corresponding to the output voltage when the first voltage level control signal is at a second logic level.

10. The voltage providing circuit according to claim 8, wherein the second level shifter is configured to:

output the second voltage level control signal at a level of the drive voltage or a level of a ground voltage when the second voltage level control signal is at a first logic level; and output the second voltage level control signal at a level corresponding to the output voltage when the second voltage level control signal is at a second logic level.

11. The voltage providing circuit according to claim 3, wherein the sink circuit includes:

a first sink controller configured to provide the drive voltage to the output node within the first time section in response to a first voltage level control signal among the voltage level control signals; and a second sink controller configured to provide the power supply voltage to the output node within the third time section in response to a second voltage level control signal among the voltage level control signals and a second control signal.

12. The voltage providing circuit according to claim 11, wherein the first sink controller includes:

a first transistor and a second transistor connected in series between the output node and an input terminal of the drive voltage, and configured to receive the first voltage level control signal through a common gate terminal thereof.

13. The voltage providing circuit according to claim 12, wherein, when the reference voltage selection signal is at a first logic level, the first transistor and the second transistor are turned on within the first time section so that the drive voltage is provided to the output node.

14. The voltage providing circuit according to claim 11, wherein the second sink controller includes:

a third transistor connected between the output node and a first terminal, and configured to receive the second voltage level control signal through a gate terminal thereof; and a fourth transistor connected between the first terminal and an input terminal of the power supply voltage, and configured to receive the second control signal through a gate terminal thereof.

15. The voltage providing circuit according to claim 14, wherein, when the reference voltage selection signal is at a second logic level, the third transistor and the fourth transistor are turned on within the third time section so that the power supply voltage is provided to the output node.

16. The voltage providing circuit according to claim 2, further comprising:

a comparator configured to compare the output voltage with a reference voltage, and to provide, to the charge pump circuit, the comparison signal corresponding to a result of the comparison; and a reference voltage selection circuit configured to output, to the comparator, a reference voltage having a selected voltage level among different voltage levels in response to the reference voltage selection signal.

17. The voltage providing circuit according to claim 16, wherein, when the reference voltage selection signal is at a first logic level, the reference voltage is set to a level of the first output voltage; and when the reference voltage selection signal is at a second logic level, the reference voltage is set to a level of the second output voltage.

18. A voltage providing circuit comprising:

a charge pump circuit configured to perform a charge pumping operation in response to a comparison signal, and to output a charge-pumped output voltage to an output node; and a voltage adjusting circuit configured to control a voltage provided to the output node at a level of a power supply voltage or at a level of a drive voltage based on a reference voltage selection signal and a sink enable signal within a time section in which the charge pump circuit is deactivated, wherein the drive voltage is lower than the power supply voltage and higher than a ground voltage.

19. The voltage providing circuit according to claim 18, wherein the voltage adjusting circuit includes:

a level shifter configured to generate a voltage level control signal in response to the sink enable signal;

a sink circuit configured to transfer a voltage of a sink node to the output node in response to the voltage level control signal; and a voltage level control circuit configured to control a level of a voltage provided to the sink node in response to the reference voltage selection signal.

20. The voltage providing circuit according to claim 19, wherein the voltage level control circuit includes:

a first level controller configured to selectively supply the power supply voltage to the sink node in response to an inversion signal of the reference voltage selection signal; and a second level controller configured to selectively supply the drive voltage to the sink node in response to a delay signal of the reference voltage selection signal.

* * * * *